United States Patent
Newbern et al.

(10) Patent No.: US 10,503,562 B2
(45) Date of Patent: Dec. 10, 2019

(54) PROCESSING DATA USING DYNAMIC PARTITIONING

(71) Applicant: Ab Initio Technology LLC, Lexington, MA (US)

(72) Inventors: Jeffrey Newbern, Sudbury, MA (US); Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 267 days.

(21) Appl. No.: 15/368,750

(22) Filed: Dec. 5, 2016

(65) Prior Publication Data

US 2017/0177414 A1    Jun. 22, 2017

Related U.S. Application Data

(60) Provisional application No. 62/268,762, filed on Dec. 17, 2015.

(51) Int. Cl.
*G06F 9/50* (2006.01)
*G06F 9/54* (2006.01)

(52) U.S. Cl.
CPC .......... *G06F 9/5072* (2013.01); *G06F 9/5077* (2013.01); *G06F 9/546* (2013.01); *G06F 2209/5011* (2013.01)

(58) Field of Classification Search
CPC .................................................. G06F 9/5072
See application file for complete search history.

(56) References Cited

U.S. PATENT DOCUMENTS

| 5,241,652 | A | 8/1993 | Barabash et al. |
| 5,819,021 | A | 10/1998 | Stanfill et al. |
| 7,793,147 | B2 | 9/2010 | Stange et al. |
| 8,059,125 | B2 | 11/2011 | Stanfill |

(Continued)

FOREIGN PATENT DOCUMENTS

| EP | 2504773 | 10/2012 |
| EP | 2966569 | 1/2016 |

OTHER PUBLICATIONS

Orailoglu, Alex. "Microarchitectural synthesis of gracefully degradable, dynamically reconfigurable ASICs." In Computer Design: VLSI in Computers and Processors, 1996. ICCD'96. Proceedings., 1996 IEEE International Conference on, pp. 112-117. IEEE, 1996.

(Continued)

*Primary Examiner* — Charlie Sun
(74) *Attorney, Agent, or Firm* — Occhiuti & Rohlicek LLP

(57) ABSTRACT

Work units are received into, and processed from, holding queues. A partition, associated with a unique holding queue, is assigned to each work unit stored in a given holding queue, according to a partitioning rule. Work units are separated from each holding queue into one of two or more other queues stored in the same storage as that holding queue. A ready queue (relocation queue) is for each work unit whose assigned partition is (is not) associated with the holding queue in which it is stored. Each work unit in each relocation queue is relocated to the holding queue associated with the partition assigned to that work unit. The work units are repartitioned in response to a change in the partitioning rule to a new partitioning rule before the holding queues are empty.

30 Claims, 7 Drawing Sheets

(56) References Cited

U.S. PATENT DOCUMENTS

| | | | |
|---|---|---|---|
| 9,043,401 B2* | 5/2015 | Wong | G06F 9/505 |
| | | | 709/205 |
| 9,197,546 B2 | 11/2015 | Kang et al. | |
| 2007/0016907 A1 | 1/2007 | Benedetti et al. | |
| 2009/0144346 A1 | 6/2009 | Duffy et al. | |
| 2009/0287986 A1* | 11/2009 | Vishniac | G06F 16/10 |
| | | | 714/819 |
| 2012/0278587 A1 | 11/2012 | Canfield et al. | |
| 2016/0062800 A1* | 3/2016 | Stanfill | G06F 9/5038 |
| | | | 718/104 |
| 2017/0337241 A1 | 11/2017 | Newbern et al. | |

OTHER PUBLICATIONS

Janssens et al., "A modular approach enforcing safe reconfiguration of produer-consumer applications," 20th IEEE International Conference on Software Maintenance, 2004, pp. 274-283, IEEE (2004).
U.S. Appl. No. 15/597,302, filed May 17, 2017, Reconfigurable Distributed Processing.

* cited by examiner

PROCESSING DATA USING DYNAMIC PARTITIONING

CROSS-REFERENCE TO RELATED APPLICATIONS

This application claims priority to U.S. Application Ser. No. 62/268,762, filed on Dec. 17, 2015, incorporated herein by reference.

BACKGROUND

This description relates to processing data using dynamic partitioning. Computing systems that process data in parallel using multiple computing nodes (e.g., servers of a server cluster, and/or cores of a multi-core processor) may distribute data among those computing nodes using a partitioner. The data can be processed in "work units" representing individual units of work, which may be in the form of an individual record with values for any number of respective fields. Alternatively, work units may be in the form of metadata associated with records, information describing events to be processed, or any other information representing an individual portion of work to be performed. Each computing node may be assigned a different partition, and one or more workers (e.g., processes or threads) running on that computing node process work units within its assigned partition. As the record is processed the values in the fields may change. In some stages of the data processing, a work unit may be in the form of an individual record along with an identified task to be applied to that record. The partitioner uses a partitioning rule to distribute a particular work unit to a particular partition to which that work unit belongs. In some computing systems, the processing is performed in stages, where work units are repartitioned for a subsequent stage among the same partitions or a different number of partitions. For example, each computing node may have an input buffer for receiving input work units, and an output buffer for providing output work units. For each output buffer, a partitioner distributes output work units from the previous stage among input buffers to be processed as input work units for the next stage. Such repartitioning is typically performed after all of the computing for the previous stage has been completed. The partitioning rule used for such repartitioning may change, but the change may be required to occur between different sets of work units. In other words, for a given set of work units the partitioning rule is static, such that all work units in the given set have been fully partitioned using the current partitioning rule before any work units in a next set can be partitioned using a next partitioning rule.

SUMMARY

In one aspect, in general, a method for processing data in a computing system, using queues that store work units including holding queues, relocation queues, and ready queues, includes: receiving work units into a plurality of holding queues stored in storage of one or more nodes of the computing system; and processing the work units from the plurality of holding queues using at least one processor in each of the one or more nodes. The processing includes: determining, for each of the holding queues, one of a plurality of partitions assigned to each work unit stored in that holding queue according to a partitioning rule, where each partition is associated with a unique holding queue, separating work units from each holding queue into a corresponding one of at least two other queues stored in the same storage as that holding queue, the two other queues including a relocation queue for each work unit whose assigned partition is not associated with the holding queue in which it is stored, and a ready queue for each work unit whose assigned partition is associated with the holding queue in which it is stored, relocating each work unit in each relocation queue to the holding queue associated with the partition assigned to that work unit, and repartitioning the work units in response to a change in the partitioning rule to a new partitioning rule before the plurality of holding queues are empty.

Aspects can include one or more of the following features.

The change in the partitioning rule includes a change in the total number of partitions in the plurality of partitions.

The one or more nodes of the computing system include a plurality of nodes, at least a first node of the plurality of nodes has storage that stores a first holding queue associated with a first partition and stores a first relocation queue and a first ready queue corresponding to the first holding queue, and at least a second node of the plurality of nodes has storage that stores a second holding queue associated with a second partition and stores a second relocation queue and a second ready queue corresponding to the second holding queue.

The change in the partitioning rule includes a change in the total number of nodes in the plurality of nodes that have storage used for storing any of the holding queues.

Relocating one or more work units in the first relocation queue includes transmitting a message including the one or more work units from the first node to the second node, where the second partition is assigned to each of the one or more work units included in the message.

The storage of the first node also stores a third holding queue associated with a third partition and stores a third relocation queue and a third ready queue corresponding to the third holding queue.

The repartitioning includes returning any work units stored in a relocation queue and a ready queue corresponding to a particular holding queue to that particular holding queue.

The partitioning rule uses a content-dependent assignment of one of the plurality of partitions to each work unit, where the partition assigned to a particular work unit is determined based on at least one value included in the work unit.

Each holding queue includes a first portion for storing work units for which an initial partition determination has not yet been made, and a second portion for storing work units for which an initial partition determination had been made causing those work units to be relocated to that holding queue.

Separating work units from each holding queue into a corresponding relocation queue or ready queue includes separating work units stored in the first portion only when the second portion is empty.

At least a first holding queue includes a third portion for storing any work units that were returned to that holding queue after the change in the partitioning rule.

The repartitioning further includes: determining, for the first holding queue, one of a plurality of partitions assigned to each work unit stored in the first holding queue according to a new partitioning rule, and separating work units from the first holding queue into a corresponding relocation queue or ready queue.

Separating work units from the first holding queue into a corresponding relocation queue or ready queue includes:

separating work units stored in the second portion only when the third portion is empty, and separating work units stored in the first portion only when both the second portion and third portion are empty.

The partitioning rule uses a content-independent assignment of one of the plurality of partitions to each work unit, where the partition assigned to a particular work unit is determined independently of any values included in the work unit.

The partitioning rule uses a load balancing assignment of one of the plurality of partitions to each work unit, where the partition assigned to a particular work unit is determined based on a quantitative measure of load for different partitions.

The quantitative measure of load for different partitions is a quantitative measure of backlog of different sets of stored work units to be relocated to holding queues associated with different partitions.

The method further includes processing work units from a first ready queue using one or more workers executing on a first node.

The repartitioning includes determining whether the new partitioning rule uses: (1) a content-dependent assignment of one of the plurality of partitions to each work unit, where the partition assigned to a particular work unit is determined based on at least one value included in the work unit, or (2) content-independent assignment of one of the plurality of partitions to each work unit, where the partition assigned to a particular work unit is determined independently of any values included in the work unit. The repartitioning includes determining whether processing work units from the first ready queue includes processing work units originating from a first holding queue in the same order in which the work units were received into the first holding queue.

The repartitioning includes draining all relocation queues before changing the partitioning rule from an old partitioning rule to the new partitioning rule, and after determining that the new partitioning rule uses content-dependent assignment and that processing work units form the first ready queue includes processing work units originating from a first holding queue in the same order in which the work units were received into the first holding queue.

The draining includes: (1) relocating each work unit in each relocation queue to a holding queue associated with the partition assigned to that work unit according to the old partitioning rule, and (2) suspending processing of work units from the first ready queue during the draining.

The partitioning rule uses a key-based assignment of one of the plurality of partitions to each work unit, where the partition assigned to a particular work unit is determined based on a function of a key value included in the work unit.

The one or more nodes of the computing system include a plurality of nodes, and storage of the plurality of nodes includes: the plurality of holding queues, and shared data accessible to each of the plurality of nodes based on key values.

The shared data is accessed by at least a first processor in a first node of the plurality of nodes during processing of one or more work units from a first ready queue stored in storage of the first node.

The shared data is partitioned according to the plurality of partitions assigned to the work units, where each key value used for accessing the shared data is associated with a unique partition of the plurality of partitions.

Repartitioning the work units in response to a change in the partitioning rule occurs after beginning to repartition the shared data according to a new partitioning rule.

Repartitioning the shared data according to the new partitioning rule includes: determining, for each reference unit of a plurality of reference units stored in the shared data, one of a plurality of partitions assigned to that reference unit according to the new partitioning rule, transferring from a previous node to a new node any reference unit whose assigned partition is not associated with the node on which that reference unit is stored, and attempting to access at least one of the reference units transferred to a new node during the repartitioning of the shared data at both the previous node and the new node.

The processing further includes: providing at least one result from each ready queue, the result from each ready queue being based on one or more work units stored in that ready queue, and removing from each ready queue work units for which a result has been provided.

In another aspect, in general, software is stored in a non-transitory form on a computer-readable medium, for processing data, using queues that store work units including holding queues, relocation queues, and ready queues. The software includes instructions for causing a computing system to: receive work units into a plurality of holding queues stored in storage of one or more nodes of the computing system; and process the work units from the plurality of holding queues using at least one processor in each of the one or more nodes. The processing includes: determining, for each of the holding queues, one of a plurality of partitions assigned to each work unit stored in that holding queue according to a partitioning rule, where each partition is associated with a unique holding queue, separating work units from each holding queue into a corresponding one of at least two other queues stored in the same storage as that holding queue, the two other queues including a relocation queue for each work unit whose assigned partition is not associated with the holding queue in which it is stored, and a ready queue for each work unit whose assigned partition is associated with the holding queue in which it is stored, relocating each work unit in each relocation queue to the holding queue associated with the partition assigned to that work unit, and repartitioning the work units in response to a change in the partitioning rule to a new partitioning rule before the plurality of holding queues are empty.

In another aspect, in general, a computing system for processing data, using queues that store work units including holding queues, relocation queues, and ready queues, includes one or more nodes. Each node includes: an input device or port configured to receiving work units into at least one holding queue stored in storage, of a plurality of holding queues; and at least one processor configured to process the work units from the holding queue. Processing for the plurality of holding queues includes: determining, for each of the holding queues, one of a plurality of partitions assigned to each work unit stored in that holding queue according to a partitioning rule, where each partition is associated with a unique holding queue, separating work units from each holding queue into a corresponding one of at least two other queues stored in the same storage as that holding queue, the two other queues including a relocation queue for each work unit whose assigned partition is not associated with the holding queue in which it is stored, and a ready queue for each work unit whose assigned partition is associated with the holding queue in which it is stored, relocating each work unit in each relocation queue to the holding queue associated with the partition assigned to that work unit, and repartitioning the work units in response to a change in the partitioning rule to a new partitioning rule before the plurality of holding queues are empty.

In another aspect, in general, a computing system for processing data, using queues that store work units including holding queues, relocation queues, and ready queues, includes: means for receiving work units into a plurality of holding queues stored in storage of one or more nodes of the computing system; and means for processing the work units from the plurality of holding queues. The processing includes: determining, for each of the holding queues, one of a plurality of partitions assigned to each work unit stored in that holding queue according to a partitioning rule, where each partition is associated with a unique holding queue, separating work units from each holding queue into a corresponding one of at least two other queues stored in the same storage as that holding queue, the two other queues including a relocation queue for each work unit whose assigned partition is not associated with the holding queue in which it is stored, and a ready queue for each work unit whose assigned partition is associated with the holding queue in which it is stored, relocating each work unit in each relocation queue to the holding queue associated with the partition assigned to that work unit, and repartitioning the work units in response to a change in the partitioning rule to a new partitioning rule before the plurality of holding queues are empty.

It is noted that the names for the different queues (e.g., 'holding queue', 'relocation queue', 'ready queue') or different sub-queues (e.g., 'pending sub-queue, 'recirculate sub-queue') are purely for labeling purposes only, and the names have no technical import whatsoever. The different queues or sub-queues with different names (also described herein as different "types of queues") may be implemented using the same technologies, and may be different solely with respect to the manner in which they are used, as described explicitly herein. Queues or sub-queues used in different ways could have been labeled using 'first', 'second', 'third' (or the like), but instead have been labeled using more descriptive words purely for convenience of the reader.

Aspects can include one or more of the following advantages.

Some data processing systems distribute work units of a computation across different servers of a server cluster using techniques such as "work stealing." For example, the workers on each server may consume work units from a corresponding work queue, and an idle server with an empty work queue can obtain work units from another server that has a large backlog of work units in its work queue. While this provides a form of dynamic parallelism that facilitates load balancing, the scalability of work stealing may be limited, partly due to the cost to communicate messages requesting work units, and partly due to the complexity in managing locality of data (i.e., some work units should not be stolen by another server but should remain with the local server).

One way to achieve locality is to migrate a task that needs to process a particular work unit from the server at which the task was spawned to the server at which that particular work unit is stored locally. But, such migration, while it is dynamic, may have a high cost due to the need to serialize and transfer the state associated with the task. In some cases, it may be more efficient for the particular work unit to be sent to the appropriate server where a worker will spawn the task to be performed on that particular work unit. Furthermore, for short-lived tasks, migrating active tasks may take a significant fraction of the entire lifetime of that task.

Explicit partitioning of work units across different servers (or other types of computing nodes) can facilitate management of locality using an appropriate partitioning rule. In some cases, locality may not matter, in which case content-independent partitioning can be used such as a round-robin partitioning rule that evenly distributes work units across servers. But, in other cases, work units may need to be distributed to servers in a content-dependent manner, such as a partitioning rule that assigns partitions based on a key value within a key field of a record.

The techniques described herein enable the partitioning rule to be changed dynamically (i.e., during the partitioning of a group of work units). Thus, the advantages of dynamic partitioning of work units can be achieved without causing an undue burden in complexity or loss of efficiency within the data processing system. For example, because there are multiple queues for different aspects of the partitioning, as described in more detail below, it is easier to determine any work units that may need to be processed again according to a new partitioning rule. There are also aspects of the partitioning procedure that facilitate preservation of relative ordering among certain work units when necessary. The data processing system can also scale the computing resources up or down as needed by changing the partitioning rule to add or remove partitions at the various computing nodes. Some of the load balancing advantages associated with work stealing can also be achieved by appropriate management of the partitioning rule.

Other features and advantages of the invention will become apparent from the following description, and from the claims.

DESCRIPTION

Figure 1:
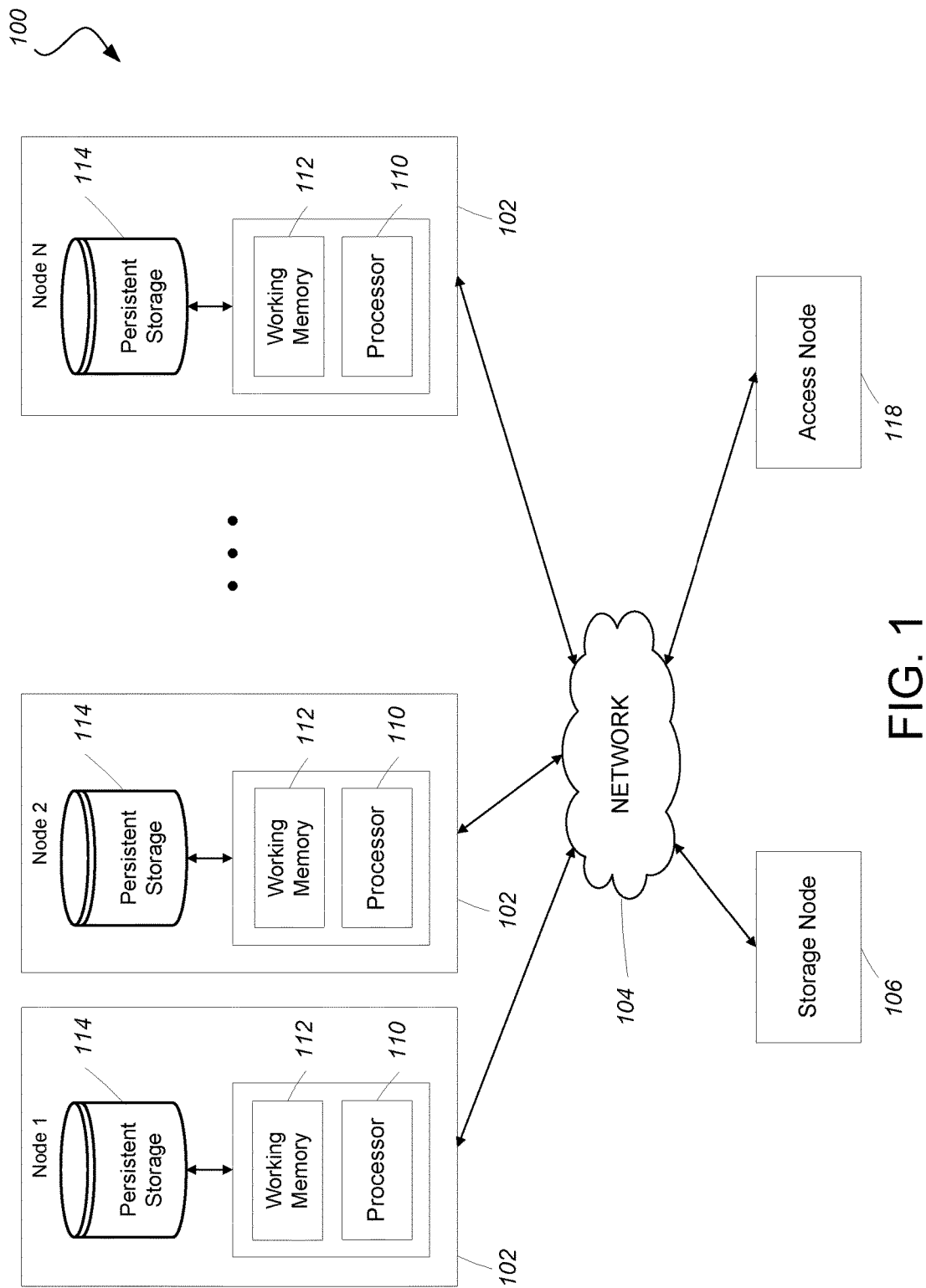
FIG. 1 is a block diagram of a data processing system.

FIG. 1 shows an example of a data processing system 100 in which the dynamic partitioning techniques can be used. The system 100 includes multiple computing nodes 102 that are in communication over a network 104 (e.g., servers communicating over a local area network (LAN) and/or wide-area network (WAN), or cores communicating over a network in a multi-core processor, or a combination thereof). The system 100 can also include other types of nodes in addition to the computing nodes 102, including one or more data storage nodes 106 that represent sources or repositories of data such as databases or other storage systems, or connections to online data streams. A computing node 102 may be implemented, for example, as a server computer with a processor 110 (e.g., a central processing unit (CPU) or a multi-core processor), working memory 112 (e.g., a volatile storage medium), and persistent storage 114 (e.g., a non-volatile storage medium). Each computing node 102 may be configured to host an execution environment under the control of a suitable operating system, such as a version of the UNIX operating system, for execution of workers to process work units stored in the node 102. Another node in the system 100 may be an access node 118 that provides a user interface for programming or interacting with a server cluster comprising some or all of the computing nodes 102 and at least a portion of the network 104. Some computing nodes 102 may not be part of the server cluster, but may offer a subset of the functionality of other computing nodes 102 (e.g., nodes that store data, but do not execute workers).

The access node 118 may provide a development environment in which a developer is able to specify data processing programs to be executed by the data processing system 100. In some implementations, the data processing programs are dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Data processing graphs," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

In some implementations, the data processing programs are data processing graphs that includes features in addition to data flow, as described in U.S. Publication No. 2016/0070729, titled "COMPILING GRAPH-BASED PROGRAM SPECIFICATIONS," incorporated herein by reference. For example, this publication describes that data processing graphs may include links between the nodes that represent any of transfer of data, or transfer of control, or both. One way to indicate the characteristics of the links is by providing different types of ports on the components. The links are directed links that are coupled from an output port of an upstream component to an input port of a downstream component. The ports have indicators that represent characteristics of how data elements are written and read from the links and/or how the components are controlled to process data.

These ports may have a number of different characteristics, some of which affect how a compiler and/or runtime computing system will partition work units to achieve parallelism. One characteristic of a port is its directionality as an input port or output port. The directed links represent data and/or control being conveyed from an output port of an upstream component to an input port of a downstream component. Another characteristic of a port is its type. A developer is permitted to link together ports of different types. Some of the data processing characteristics of the data processing graph depend on how ports of different types are linked together. For example, links between different types of ports can lead to nested subsets of components in different "execution sets" that provide a hierarchical form of parallelism where each execution is fed by an upstream collection of work units that can be partitioned among multiple instances of the components in that execution set. The different types of ports that a component may have include:

Collection input or output ports, meaning that an instance of the component will read or write, respectively, all work units of a collection that will pass over the link coupled to the port. For a pair of components with a single link between their collection ports, the downstream component is generally permitted to read work units as they are being written by an upstream component, enabling pipeline parallelism between upstream and downstream components. The work units can also be reordered, which enables efficiency in parallelization. In some graphical representations, for example in the data processing graphs shown in FIGS. 2, 5A, and 5B, such collection ports are generally indicated by a square shaped connector symbol at the component.

Scalar input or output ports, meaning that an instance of the component will read or write, respectively, at most one work unit from or to a link coupled to the port. For a pair of components with a single link between their scalar ports, serial execution of the down stream component after the upstream component has finished executing is enforced using transfer of the single work unit as a transfer of control. In some graphical representations, for example in the data processing graphs shown in FIGS. 2, 5A, and 5B, such scalar ports are generally indicated by a triangle shaped connector symbol at the component.

Control input or output ports, which are similar to scalar inputs or outputs, but no work unit is required to be sent, and are used to communicate transfers of control between components. For a pair of components with a link between their control ports, serial execution of the down stream component after the upstream component has finished executing is enforced (even if those components also have a link between collection ports). In some graphical representations, such control ports are generally indicated by a circular shaped connector symbol at the component.

These different types of ports enable flexible design of data processing graphs, allowing powerful combinations of data and control flow with the overlapping properties of the port types. In particular, there are two types of ports, collection ports and scalar ports, that convey data in some form (called "data ports"); and there are two types of ports, scalar ports and control ports, that enforce serial execution (called "serial ports"). A data processing graph will generally have one or more components that are "source components" (which may not have any connected input data ports), and one or more components that are "sink components" (which may not have any connected output data ports).

Connections between different types of ports also indicate different execution sets. In particular, a link from a collection type output port to a scalar type input port implies an entry point into an execution set, and a link from a scalar type output port to a collection type input port implies an exit point of an execution set. A compiler can perform a discovery algorithm to automatically assign components to execution sets, and the computing system can dynamically parallelize the execution sets to process work units from a collection of work units using the dynamic partitioning techniques described herein.

Figure 2:
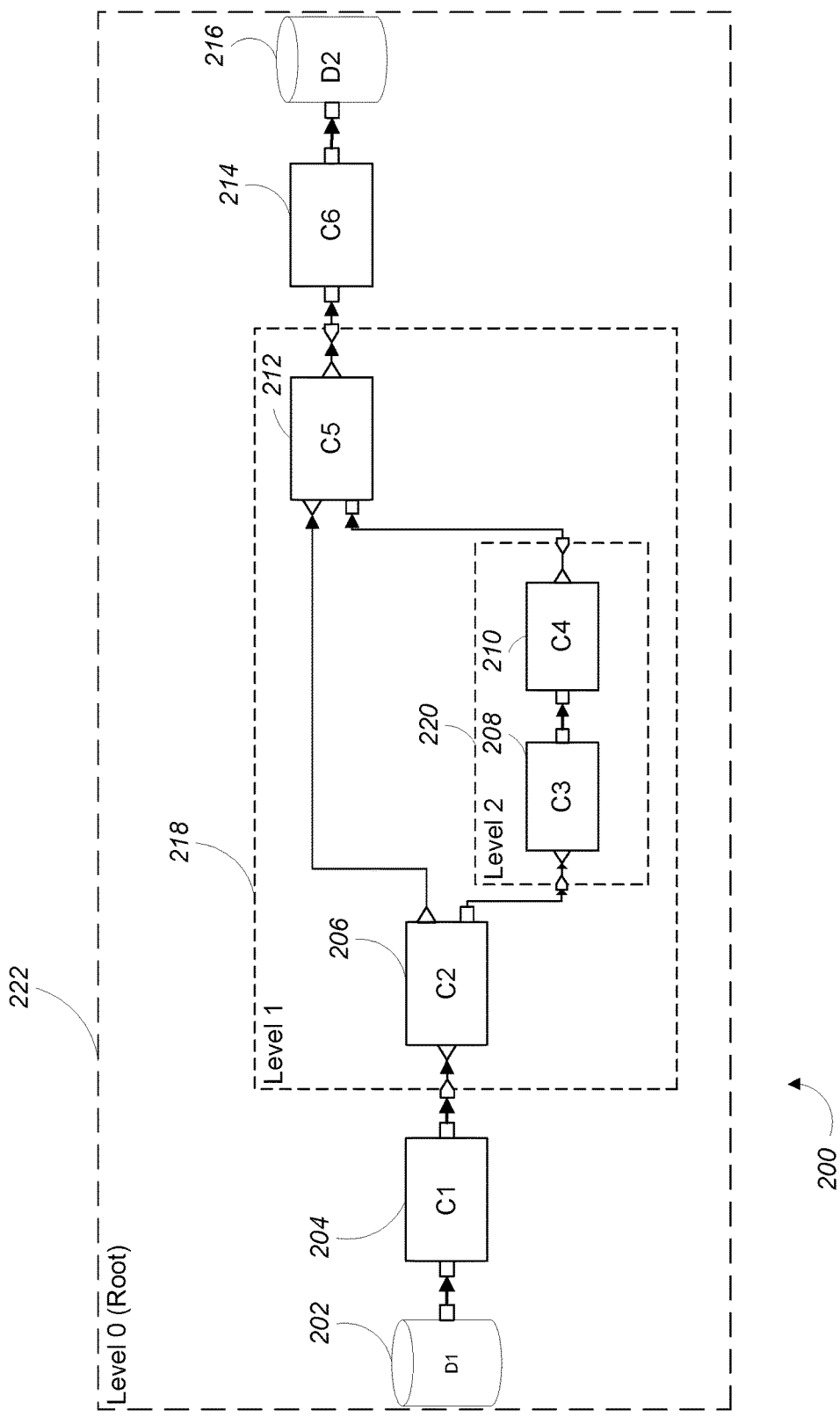
FIG. 2 is a diagram of a data processing graph.

FIG. 2 shows an example of a data processing graph 200 within a programming graphical interface. The data processing graph 200 includes a first dataset (D1) 202, a first component (C1) 204, a second component (C2) 206, a third component (C3) 208, a fourth component (C4) 210, a fifth component (C5) 212, a sixth component (C6) 214, and a second dataset (D2) 216. The compiler is able to assign individual components and datasets of the data processing graph 200 to execution sets using an execution set discover procedure that results in the discovery of a "Level 1" execution set 218 and a "Level 2" execution set 220 (in addition to the Root, "Level 0" execution set 222). Each execution set, other than the Root execution set 222, is fed by an upstream collection of work units, and work units corresponding to a different instance of the execution set operating on each incoming work unit can be partitioned among computing nodes 102 at runtime. The ability to perform such partitioning can be indicated by the compiler using a "for-all" primitive that the compiler inserts into executable code, which at runtime triggers the creation of a buffer data structure with multiple queues, called a multiple queue structure (MQS), described in more detail below.

At runtime, the for-all primitive triggers a for-all operation, which is performed by pools of workers distributed across a group of computing nodes 102 called a "server group," (where each computing node 102 is a "server" managing a pool of workers). For all work units within a collection of work units to be processed by an execution set, an instance of the group of components in that execution set is executed on one of the servers in the server group. Each server in the server group has an MQS managed by a corresponding partitioner, together forming a group of MQSs for that server group. The servers within the server group are not necessarily constant over the life of the for-all operation (e.g., servers may be dynamically added to or removed from the server group). The for-all operation will notice the change in the server group. If a server is added, it will start up a worker pool on the new server to consume work from an allocated MQS, and change the partitioning function used by all the partitioners managing the MQSs. If a server is removed, its worker pool is taken away and its work is relocated or is drained, according to the techniques described herein.

The MQSs can also be used as buffers for other types of operations other than for-all operations. For example, database operations such as "rollup" or "join" can be implemented as a for-all operation by including additional steps to accumulate the results of the operation. Also, an MQS can be used between upstream and downstream portions of a data processing program that execute on a different number of computing nodes 102 downstream as upstream. For example, if the computing nodes 102 are cores on a multicore processor, and a downstream processor has twice as many cores as an upstream processor, then a group of MQSs can be used to pass work units from one upstream thread to two downstream threads. If intelligently partitioned according to a memory hierarchy, all the data processed on one core can go to other cores that share the same local cache.

Each MQS is managed by a partitioner configured with a partitioning rule that can be determined statically (by the compiler before runtime), dynamically (at runtime), and/or dynamically changed as work units are processed. For example, the compiler may indicate a default partitioning rule that uses few partitions (or only one local partition, in which case no partitioning needs to be performed), and then at runtime if the actual workload becomes larger than some threshold, a dynamic decision can be made at some point to increase the number of partitions. After such a change in the partitioning rule, any given work unit may be repartitioned (e.g., to add or remove partitions, or for another reason) any time up until it is processed by a worker that consumes work units from an MQS, as described in more detail below.

Any of a variety of partitioning rules can be used to compute the partition for a given work unit. In some cases, the partition is based on a key value for the work unit, and a function is applied to the key value, such as a hash function. The result of the hash function modulo the number of partitions can be used. Other options include range partitioning, where ranges of key values are assigned to different partitions. In some cases, to increase efficiency of the parallelization, statistical range partitioning can be used for keys that are not unique, where "heavy" keys known to be more likely to belong to a larger number of work units are placed into partitions alone or with only "light" keys known to be more likely to belong to a smaller number of work units. For example, if the key corresponds to area code, then area codes for large cities may be assigned to different partitions, or area codes for the largest cities may be purposely assigned to the same partition as area codes for smallest towns.

In addition to the work units that are consumed or produced by workers executing tasks specified by the data processing programs (perhaps as part of the work unit), in some cases there are also other longer-lived data that may persist beyond the runtime of the data processing programs. Such longer-lived "reference units" of data can be accessed by the workers executing on a computing node 102 from the persistent storage 114, or from the data storage nodes 106, for example. In some implementations, the reference units are provided as shared data accessible to all of the computing nodes 102 in the form of keyed shared variables that may be accessed (i.e., read or written), using a unique key value for each shared variable. Appropriate access controls can be used to avoid data races when accessing these keyed shared variables, such as locks. Reference units can also be stored within datasets (e.g., files or database tables) that are accessible to the computing nodes 102. In cases the reference units may also be partitioned over multiple partitions stored on different nodes of the system 100.

Figure 3A:
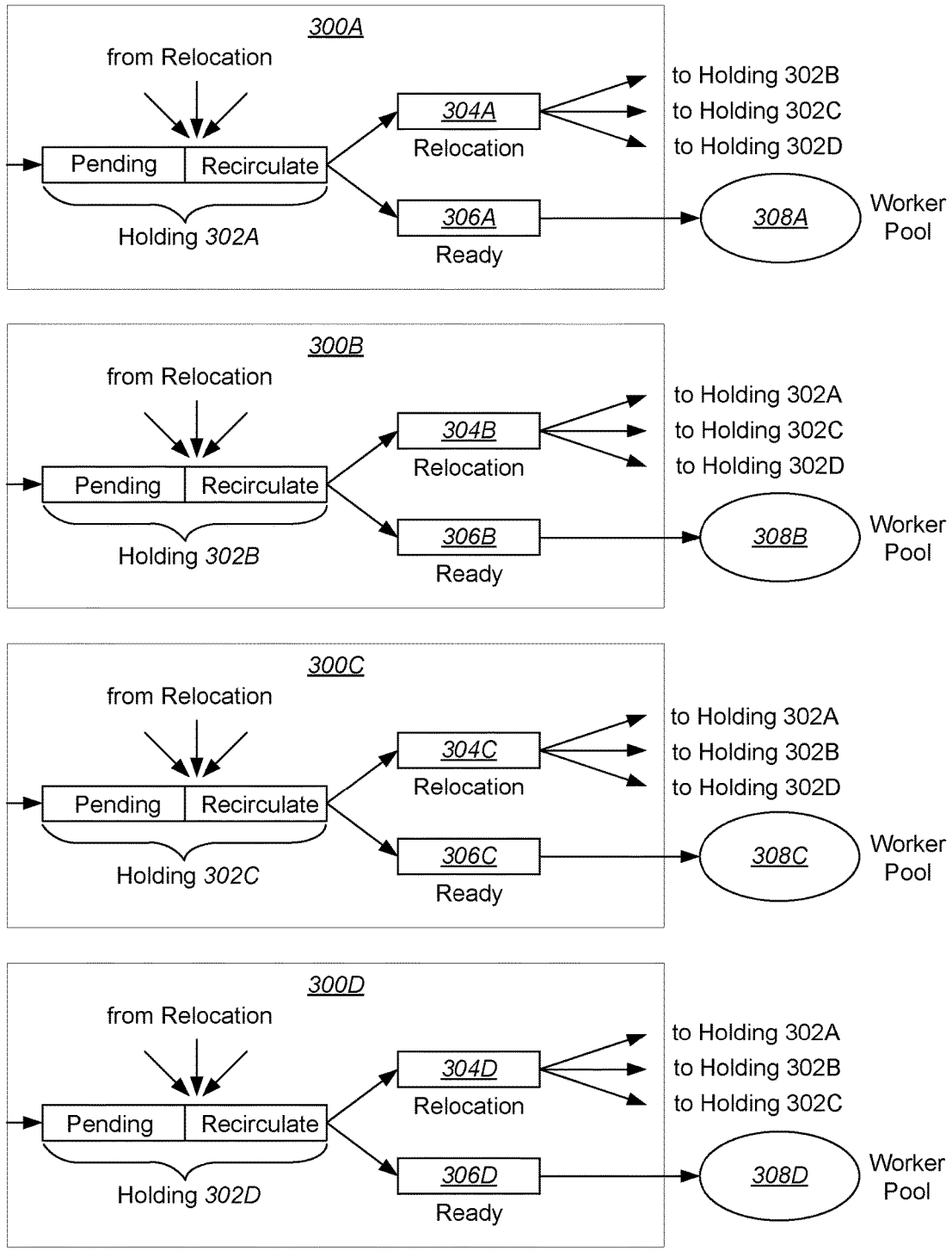
FIG. 3A is a diagram of a set of multiple queue structures.

The data processing system 100 can be configured to partition work units (e.g., to implement a for-all primitive) using multiple partitioners that each manage one of the partitions and a corresponding MQS, which may be stored in the working memory 112, or the persistent storage 114, of a computing node 102, or a combination of both (e.g., using a caching scheme). Referring to FIG. 3A, an example of a set of MQSs 300A, 300B, 300C, 300D shows how the multiple queues that make up each MQS are related to each other, and to queues of other MQSs. Each individual queue within the MQS has a "first in, first out" (FIFO) property, such that work units are added to one end (the back or "tail" end) and removed from the other end (the front or "head" end). The number of partitions N is determined by the partitioning rule, which is the same for each of the partitioners. In this example, N=4, with the different partitions labeled A, B, C, and D. Typically, there may be one partition for each computing node 102, and in that case each MQS would be stored on a different computing node 102. However, it is also possible for a single computing node 102 to be assigned multiple partitions, which may be associated with different processes and/or different cores, for example, on that computing node 102. In that case, a computing node 102 could store multiple MQSs.

Each MQS includes a holding queue that receives incoming work units to be partitioned. So, in this example, there is one holding queue 302A, 302B, 302C, 302D for each MQS 300A, 300B, 300C, 300D, respectively (and thus a unique holding queue associated with each partition A, B, C, D). These work units may be arriving from one or more sources that are on a subset of the computing nodes 102, so the initial arrival of work units to the holding queues may populate fewer than all of the holding queues and/or may fill the holding queue unevenly. The goal of the partitioning rule used by the partitioners may be to redistribute the work units arriving at the holding queues in a particular manner.

A partitioner, executing on a processor 110, processes the work units for a given MQS. Specifically, the partitioner for each MQS determines which one of the N partitions is assigned to each work unit stored in the holding queue of that MQS, according to the partitioning rule. The partitioning rule may assign a partition to a work unit in a "content-dependent" manner, where the partition assigned to a particular work unit is determined based on at least one value included in the work unit, or in a "content-independent" manner, where the partition assigned to a particular work unit is determined independently of any values included in the work unit. A content-dependent partitioning rule may, for example, use a key value in a work unit (or a hash function applied to the key value). They key value may be any of a variety of types of key values, such as a primary key of a work unit, an explicit partitioning key assigned to a work unit, a serialization key where work units assigned the same serialization key must be processed serially in their order of arrival, a shared variable key that is used to access a particular shared variable, or a key for a database operation such as a rollup key or a join key. A content-independent partitioning rule may, for example, use a round-robin distribution, a pseudo-random distribution, or a distribution that is dependent on factors other than work unit content, such as a load balancing distribution that has a preference for partitions that have a smaller backlog of work units in the MQS, or a distribution that has a preference to keep a work unit at a partition on the local computing node 102.

Based on the determination of a partition assigned to a particular work unit, the partitioner separates work units from each holding queue into a corresponding one of two other types of queues within the respective MQS. One type of queue is a set of relocation queues 304A, 304B, 304C, 304D (corresponding to holding queues 302A, 302B, 302C, 302D, respectively), each stored in the same storage as its corresponding holding queue. For each work unit whose assigned partition is not associated with the holding queue in which it is stored, the partitioner moves the work unit from that holding queue into the corresponding relocation queue. Another type of queue is a set of ready queues 306A, 306B, 306C, 306D (corresponding to holding queues 302A, 302B, 302C, 302D, respectively), each stored in the same storage as its corresponding holding queue. For each work unit whose assigned partition is associated with the holding queue in which it is stored, the partitioner moves the work unit from that holding queue into the corresponding ready queue. For each ready queue 306A, 306B, 306C, 306D, there is a corresponding worker pool 308A, 308B, 308C, 308D, which consumes work units from that ready queue.

The relocation queues of a given MQS are also processed by the partitioner for that MQS. As the relocation queues fill, the partitioner relocates each work unit in each relocation queue to the holding queue associated with the partition assigned to that work unit. So, as illustrated in FIG. 3A, work units in the relocation queue 304A are sent to any of holding queues 302B, 302C, or 302D; work units in the relocation queue 304B are sent to any of holding queues 302A, 302C, or 302D; work units in the relocation queue 304C are sent to any of holding queues 302A, 302B, or 302D; and work units in the relocation queue 304D are sent to any of holding queues 302A, 302B, or 302C. For the case in which the MQSs are stored on different computing nodes 102, relocating one or more work units assigned to a particular partition (e.g., partition B) from a relocation queue (e.g., relocation queue A) includes transmitting a message including the one or more work units over the network 104 between the appropriate computing nodes 102. Work units can be transmitted individually, or for efficiency, the partitioner (or a background process separate from the partitioner) can transmit work units at regular intervals (e.g., every 100 ms) in batches of work units going to the same partition/MQS bundled into the same message (thus reducing the total number of messages). Alternatively, if the MQSs are stored on the same computing node 102, relocating one or more work units may involve simply moving those work units (or pointers to those work units) from one portion of working memory 112 to another. Also, in some implementations, instead of a single relocation queue within each MQS, there may be multiple separate relocation queues, with one for each potential destination partition (i.e., N−1 relocation queues).

The ready queues are processed by the workers of the computing node storing the MQS. As a ready queue fills, one or more workers on the same computing node 102 on which that ready queue is stored consume work units from that ready queue. The task that a worker performs to "consume" a work unit after it removes the work unit from the ready queue depends on the data processing program that initiated allocation of the MQS, and in some cases also depends on the work unit itself. One example of a task is the subgraph represented by an execution set discovered form a data processing graph. Another example of a task is a database operation such as a join operation that combines the consumed work units with other work units, or a rollup operation that aggregates work units by updating an accumulated result as each work unit is consumed. For a rollup operation, the accumulated result may be stored as reference units such as an array of partial aggregates, and when a work unit is consumed, it is either added as a new entry in the array (if the key has not previously appeared), or used to update one of the partial aggregates.

In some implementations, each holding queue is divided into two portions, or equivalently, is maintained as two separate queues. A first portion of a holding queue called a "pending sub-queue" stores work units for which an initial partition determination has not yet been made (i.e., for work units that have not been relocated from a different MQS). A second portion of a holding queue called a "recirculate sub-queue" stores work units for which an initial partition determination had been made causing those work units to be relocated to that holding queue. When work units are separated from each holding queue into a corresponding relocation queue or ready queue, work units are first taken from those stored in the recirculate sub-queue, and are then taken from those stored in the pending sub-queue only when the recirculate sub-queue is empty.

In some implementations, each holding queue is divided into three portions, or equivalently, is maintained as three separate queues. In addition to the pending sub-queue and the recirculate sub-queue, a third portion of a holding queue called a "return sub-queue" stores any work units that were returned to that holding queue after the change in the partitioning rule. After a change in the partitioning rule, work units are removed from these portions of the holding queue (into a ready queue or relocation queue) according to the new partitioning rule in the following order: first the return sub-queue, then the recirculate sub-queue, then the pending sub-queue. So, work units are taken from the recirculate sub-queue only when the return sub-queue is empty, and work units are taken from the pending sub-queue only when both the recirculate sub-queue and the return sub-queue are empty.

Dividing the holding queue into two or three portions, as described above, can be helpful for ensuring that work units are repartitioned "correctly" according to their content. However, for content-independent partitioning, it may not be necessary to return work units to a return sub-queue for repartitioning.

There are also some cases in which relative ordering among work units must be maintained, and in such cases there are additional techniques for maintaining partial ordering when changing the partitioning rule. For example, one partial ordering property that can be maintained is that any work unit that has always been in the same MQS as another work unit will stay in order relative to that work unit. For cases in which the relative ordering among work units matters, an exemplary procedure based on "partitioning epochs" is described in more detail below.

The queues of an MQS can also be divided into multiple portions, or separate queues, for other reasons. For example, each queue may be divided into a different sub-queue for each worker that consumes work units from the ready queue of the MQS. Another reason there can be multiple sub-queues is to facilitate dynamic load balancing. The partitioner can maintain separate sub-queues that are different versions of the relocation queue for each other MQS to which work units could be sent. The lengths of those relocation sub-queues can then be used to sense back-pressure indicating how busy each MQS is. The partitioner can also sense back-pressure from its own ready queue to decide whether a given work unit should stay in its own partition or be moved into one of the relocation sub-queues for relocation to a partition of a different MQS.

For dynamic partitioning, the partitioning rule can be changed and the work units repartitioned before completion of partitioning under the previous partitioning rule (i.e., before the holding queues of all the MQSs are empty). When the partitioning rule is to be changed, there are different procedures that the partitioners can use manage their MQSs, depending on both the nature of the partitioning and any ordering requirements downstream of the MQS. Generally, the manner in which the partitioner repartitions the work units in response to a change in the partitioning rule depends on whether the assignment of partitions to work units is content-dependent, or content-independent, as defined above. In the content-dependent case, the repartitioning includes a step of returning any work units stored in a relocation queue and a ready queue corresponding to a particular holding queue to that particular holding queue. The work units that are returned may be returned to the return sub-queue defined above. In the content-independent case, the repartitioning does not need to perform that step. In cases where there are certain ordering requirements for the content-dependent case, there is also an additional step of draining relocation queues. For either content-dependent or content-independent partitioning, the number of partitions may change when the partitioning rule changes. A new MQS and partitioner is added for each new partition, but an old partition that is being removed may keep its MQS and partitioner until that MQS does not store any work units. Detailed examples of specific procedures for performing the repartitioning are described in more detail below.

Figure 3B:
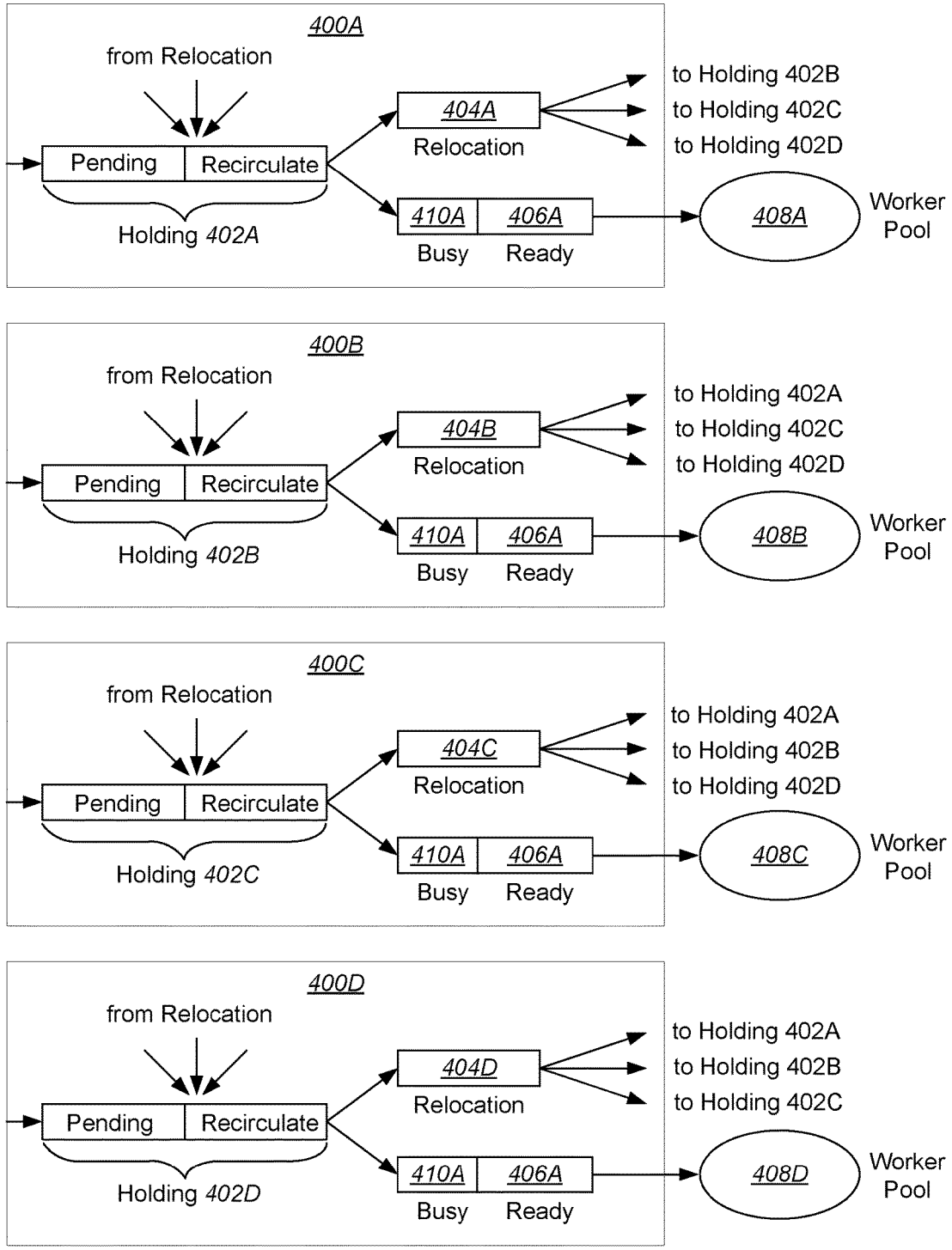
FIG. 3B is a diagram of an alternative set of multiple queue structures.

Before describing those procedures, an example of an alternative MQS implementation is shown in FIG. 3B. In this example, there is one holding queue 402A, 402B, 402C, 402D for each MQS 400A, 400B, 400C, 400D, respectively. As in the example of FIG. 3A, the example of FIG. 3B also includes a corresponding set of relocation queues 404A, 404B, 404C, 404D, a corresponding set of ready queues 406A, 406B, 406C, 406D, and worker pools 408A, 408B, 408C, 408D, which consume work units from those ready queues. However, in this example, in order to enforce a serialization constraint that only a single work unit with a given serialization key can be consumed by a worker at any given time, each ready queue can only store no more than one work unit with a given serialization key at a time. So, there is an additional set of busy queues 410A, 410B, 410C, 410D (corresponding to holding queues 402A, 402B, 402C, 402D, respectively). It is assumed that each work unit has been assigned a serialization key, such that any work units that are constrained to be performed serially have the same value of the serialization key (and are said to be in the same "key group"). After determining a partition assigned to a particular work unit, the partitioner separates work units from each holding queue into a corresponding one of three other types of queues within the respective MQS. A work unit that needs to be relocated is still moved to the corresponding relocation queue. But, a work unit that does not need to be relocated is only moved to the corresponding ready queue if that ready queue does not currently store another work unit in the same key group (i.e., with the same serialization key) and the worker pool for that ready queue is not currently processing another work unit in the same key group. Given that a worker pool can process multiple work units concurrently, a work unit is not allowed into the ready queue if the worker pool is currently processing a work unit from the same key group because if it was allowed into the ready queue the worker pool could take it from the ready queue and process both work units from the same key group concurrently. The partitioner can track whether or not either of these conditions is true, for example, using one or more Boolean flags for each serialization key (e.g., in a bitmap) that track the presence of work units with different serialization keys in the ready queue or being processed by a worker pool. If the ready queue does store another work unit in the same key group or the worker pool is processing another work unit in the same key group, then the work unit is moved to the corresponding busy queue. The partitioner (or a background process separate from the partitioner) moves work units from the busy queue to the ready queue as work units from the same key group are removed from the ready queue by a worker pool and the worker pool finishes processing work units from the same key group. When there is a change in the partitioning rule, work units in a busy queue are moved to the return sub-queue along with work units in the ready queue, without changing their relative order.

In some cases, the decisions made by the partitioner can be simplified. For example, in a content-independent case that uses a round-robin or random partitioning rule, a work unit that is being moved from the recirculate sub-queue of a holding queue can be moved directly to the ready queue without the partitioner having to determine (or verify) its partition. This is because the initial round-robin or random decision only needs to be made once when the work unit is moved from the pending sub-queue of a holding queue. Then, when the work unit is in the recirculate sub-queue, it can be assumed that the decision is still correct as long as the partitioning rule has not changed.

In some implementations, the techniques for partitioning the longer-lived reference units among nodes of the data processing system 100 are different from the techniques for partitioning the shorter-lived work units. For managing MQSs the system 100 spawns work unit partitioners, and for managing reference units, the system 100 spawns reference unit partitioners at the appropriate nodes to partition the reference units based on a partitioning rule (e.g., based on a key for keyed shared variables provided by the compiler to ensure that the variables will be located on the computing nodes 102 where tasks for that key will be spawned). Since individual reference units may generally be larger than individual work units, transferring reference units between nodes may take a longer amount of time. However, the workers may need to access reference units while they perform tasks to consume work units. So, the techniques for dynamic repartitioning of reference units include a partitioning procedure that migrates reference units asynchronously, and provides a way to access the reference units during the migration that allows for the possibility that any particular reference unit may be located at an old node, a new node, or in transit between the old node and the new node.

For example, for accessing keyed shared variables partitioned over the computing nodes 102 during the partitioning procedure, the data processing system 100 determines which computing node 102 stores the variable with a particular key, and then spawns a task to access that variable on that computing node 102. For determining which computing node 102 stores the variable, the partitioning procedure provides functions (e.g., based on hash functions) applied to the key for computing both the old partition and the new partition. Before accessing a shared variable, its key is used to determine the old partition and check the old storage location of the old partition for the variable. If the variable is not found at the old storage location, the key is used to determine the new partition and check the new storage location of the new partition for the variable. If the variable is not found at the new storage location, it is determined to not exist (as long as the procedure for checking waits long enough to account for transit time between storage locations). If a variable is accessed during partitioning procedure, the variable may be temporarily delayed from migrating until after the access is completed. After the partitioning procedure is complete, the function for computing the old partition is no longer needed. Some implementations allow multiple partitioning procedures to be in progress at the same time, in which case the number of storage locations to check for the presence of the variable increases, from oldest to newest until it is found, or determined to not exist.

A variation on the partitioning procedure for reference units is an incremental partitioning procedure in which the reference units are not all migrated at the same time. For example, for keyed shared variables, there are multiple groups of reference units, as determined by a hash function used to divide the keys into a predetermined number of groups (which are independent from the partitions). Then, only variables with keys in one of the groups is being migrated at a time, and any other variables not in that group are guaranteed to be in a particular storage location (either the old storage location or the new storage location, depending on whether its group has been migrated yet or not). That way, only variables whose keys are in the group being migrated have the potential to require both storage locations to be checked before finding the variable. Thus, the incremental partitioning procedure reduces the overall communication needed if many of the reference units are accessed during the migration.

Figure 4A:
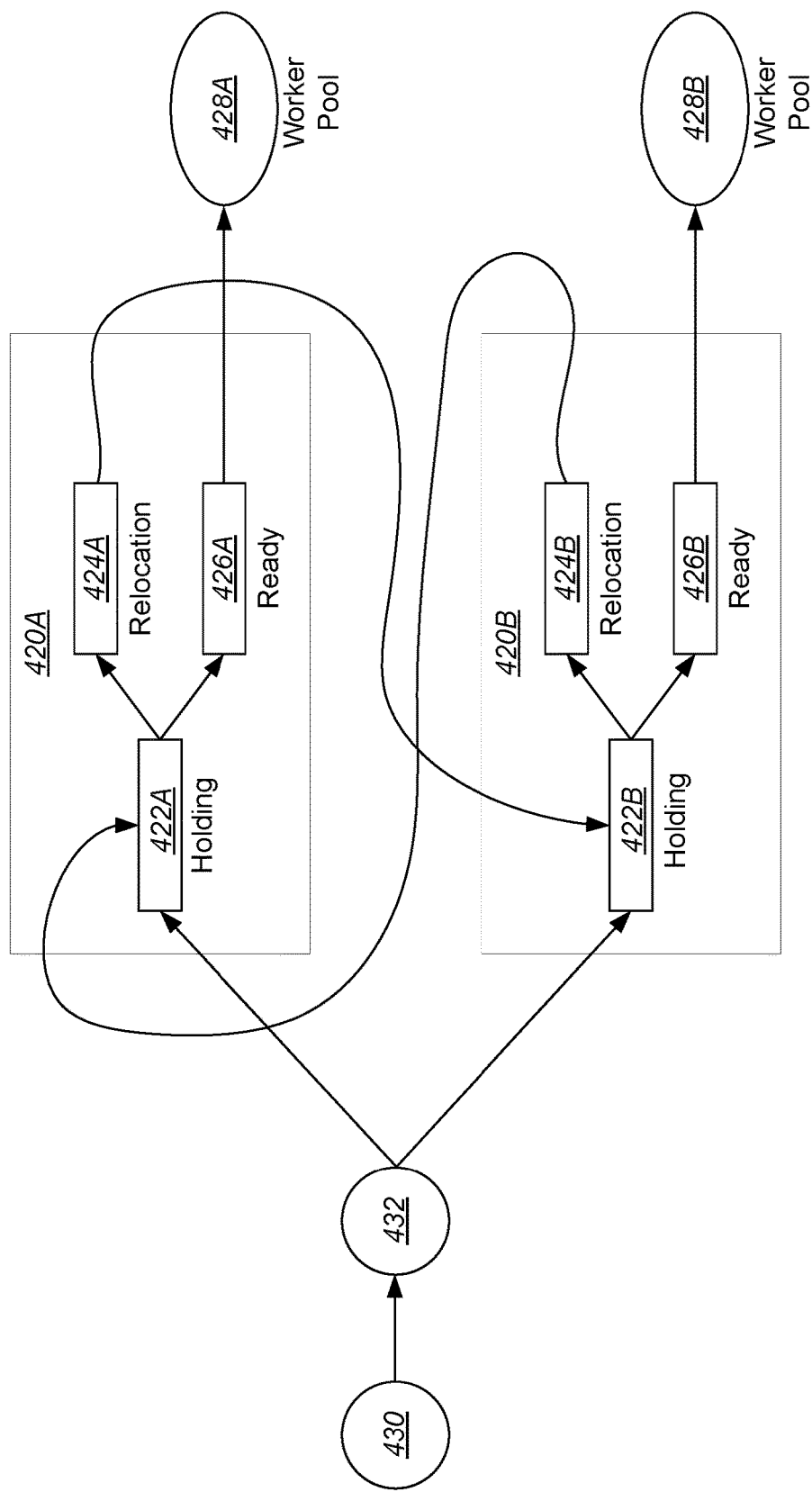
FIGS. 4A and 4B are diagrams of a set of multiple queue structures showing connections and an example path of a work unit.
Figure 4B:
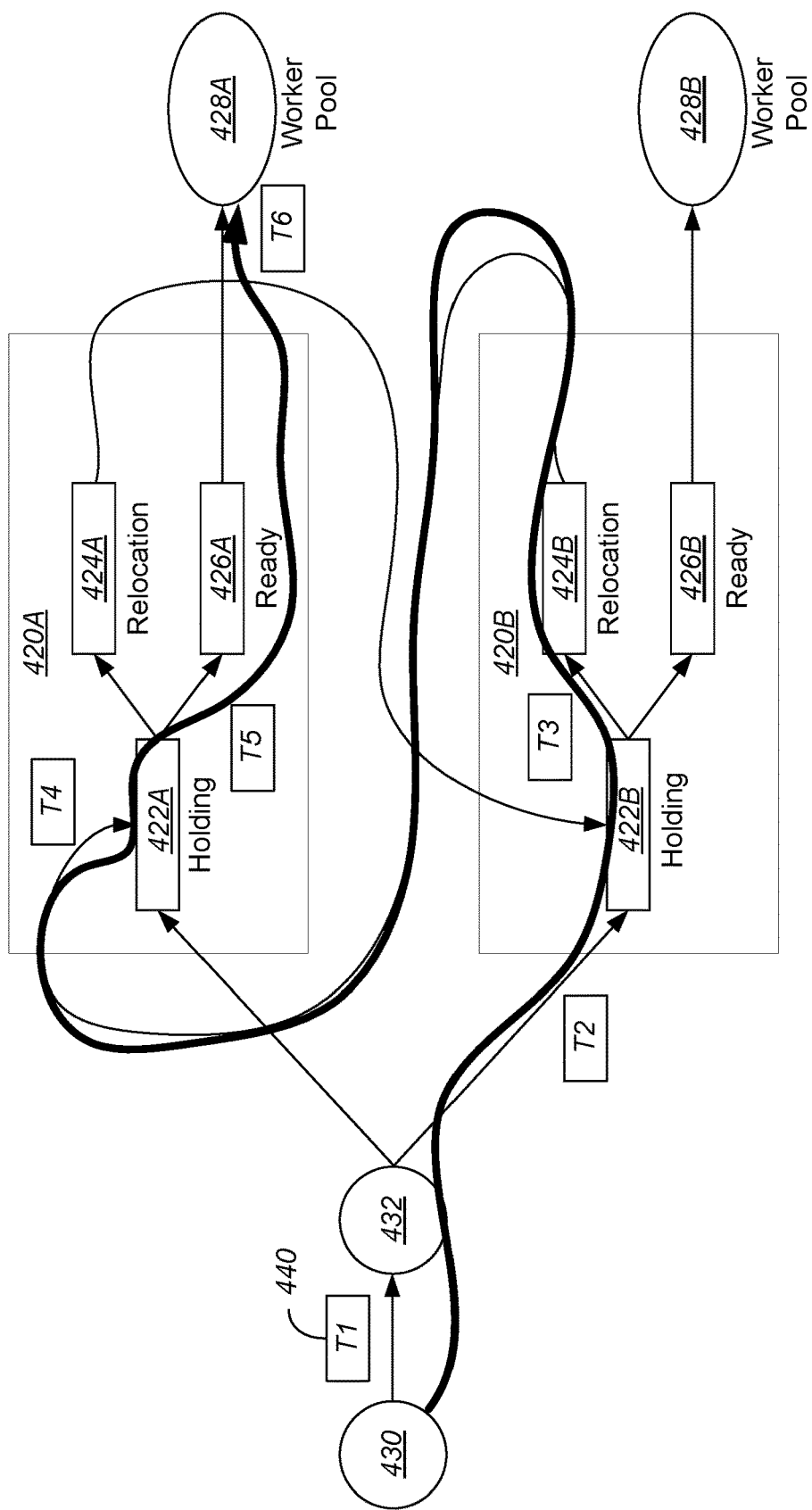

FIG. 4A illustrates an example of a set of two MQSs with connections between different types of queues within the MQSs shown explicitly. There is one holding queue 422A, 422B, for each MQS 420A, 420B, respectively. There is also a corresponding set of relocation queues 424A, 424B, a corresponding set of ready queues 426A, 426B. In this example, the connection between the relocation queue 424A and the holding queue 422B, and the connection between the relocation queue 424B and the holding queue 422A, are shown explicitly. There are also worker pools 408A, 408B that consume work units from the ready queues 426A, 426B, respectively. In this example, an upstream source 430 of work elements is also shown, along with an incoming partitioner 432 that provides work elements to the holding queues of each MQS. Alternatively, in other examples, each holding queue may receive work elements from different sources and the partitioning may be accomplished entirely by the individual partitioners associated with each MQS, without the need for the incoming partitioner 432. FIG. 4B shows an example of a path taken by a work unit 440 as it traverses the various queues of the set of MQSs 420A, 420B. The work unit 440 is labeled by relative times T1, T2, T3, T4, T5, T6, as it progresses through the set of MQSs. In this example, the work unit 440 is initially assigned to partition B of MQS 420B (at time T2), but is dynamically repartitioned to partition A of MQS 420A, before ultimately being processed (or "consumed") by worker pool 428A (at time T6).

Figure 5A:
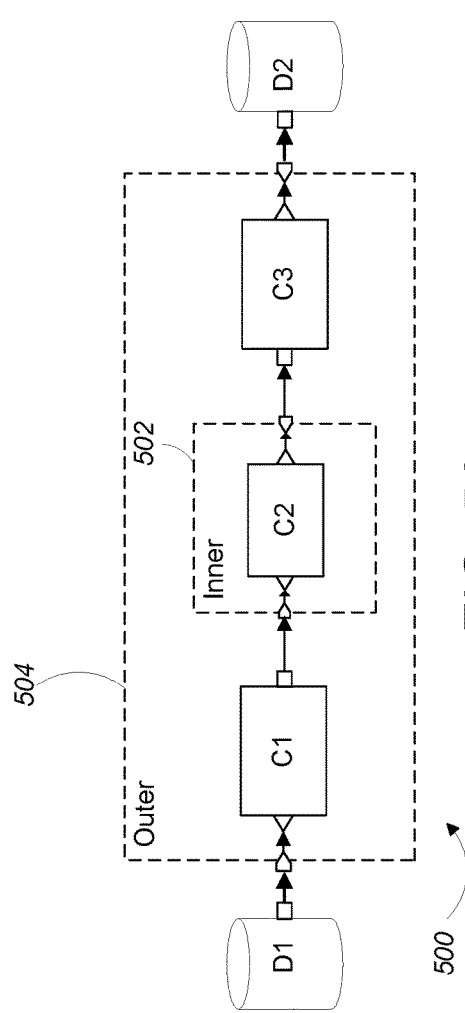
FIGS. 5A and 5B are diagrams of data processing graphs.
Figure 5B:
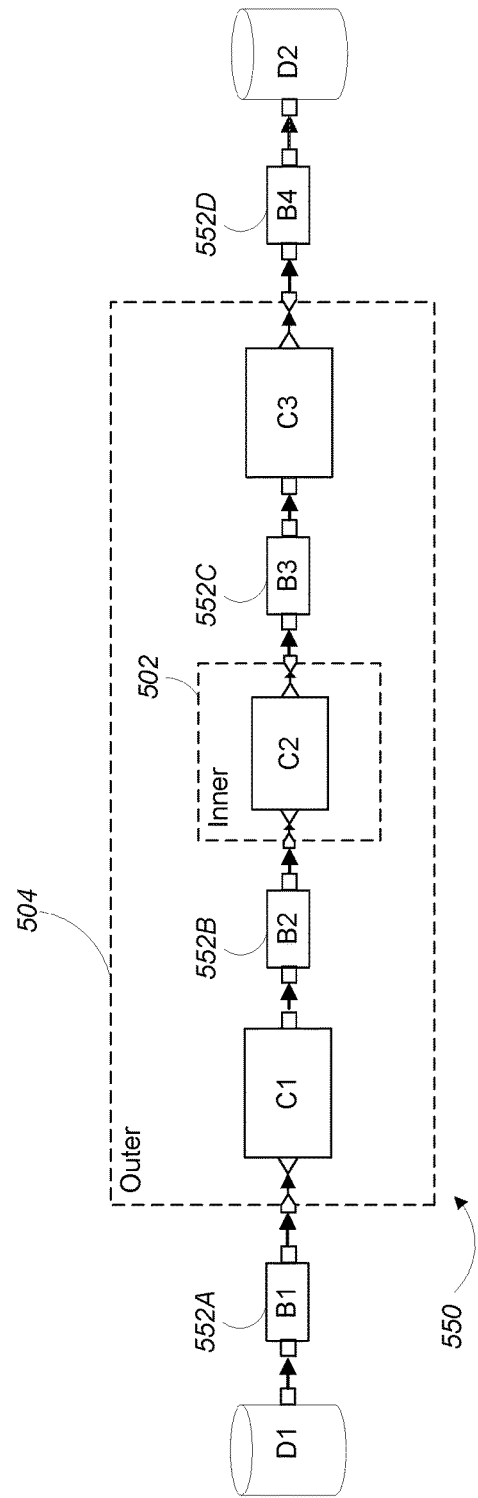

The data processing system 100 is also configured to select the kind of partitioning rule that should be used by the partitioner when managing an MQS based on the kind of buffering that is needed within a data processing program. FIG. 5A shows an example of a data processing graph 500 with nested execution sets, including an inner loop 502 and an outer loop 504, each of which performs computation in a loop that iterates over an incoming stream of work units. The compiler is able to insert buffer components that each corresponds to a set of MQSs for partitioning a loop over multiple computing nodes 102 of the system 100. FIG. 5B shows how a corresponding data processing graph 550 would appear (at least conceptually) after the compiler adds buffer components to handle partitioning for nested execution sets. In particular, each of the buffer components 552A, 552B, 552C, and 552D represents a respective set of MQSs allocated at runtime and distributed over computing nodes 102. In some implementations, these buffer components added by the compiler are not displayed to the user.

In this example, the dynamic partitioning functionality that the MQSs provide gives the compiler and the runtime system the flexibility to make efficient choices for parallelizing the inner and outer loops. The system 100 can configure the partitioners handling the MQSs so that the partitioning for the inner loop and outer loops are compatible and efficient. The system 100 may also take into account whether the partitioning rules are required to be content-dependent or content-independent. For example, for content-independent partitioning rules, the options for the inner loop can include: (1) keeping all work elements of an outer loop partition on the associated "local" node (i.e., no repartitioning), or (2) partitioning the work elements from a local node of an outer loop partition across all nodes. Option 1 is potentially more scalable, but option 2 is potentially faster, depending on the quantity of work elements being processed. If the outer loop is large (i.e., has a large number of iterations) and the inner loop is small (i.e., has a small number of iterations), then option 1 may be faster than option 2. One explanation for this is that, for option 2, there is not enough time to win back the overhead cost of partitioning the work elements for the (small) inner loop. Whereas, if the outer loop is small and the inner loop is large, then option 1 may not be faster than option 2. One explanation for this is that the (small) outer loop may only partition over a few of the computing nodes 102, and the partitioning of option 2 enables the remaining computing nodes 102 to be used to help perform the (large) inner loop faster.

The dynamic partitioning functionality may be useful for selecting the appropriate option because the system 100 may not have enough information about the relative sizes of the inner and outer loops until runtime. The compiler may use default partitioning rules for the partitioners based on certain assumptions. For example, one assumption may be that inner loops will be small compared to their outer loops. Additionally, there may be certain sources that are likely to produce a large number of work elements (e.g., based on statistics from past runs), and/or sources that can be analyzed to estimate the number of work elements likely to be produced (e.g., for a file, the file size can be used to estimate how many work units it contains). Then, at runtime the system 100 can dynamically determine when a default partitioning rule should be changed. For example, if the number of work elements processed by an inner loop exceeds a threshold (an predetermined threshold, or a threshold relative to the outer loop), then the partitioning rule can be changed using the techniques described herein.

As mentioned above, there are also multiple options when it comes to determining how to respond to a change in the partitioning rule. The best option depends on both the nature of the partitioning and the ordering requirements of processing that occurs downstream of the buffer being implemented with a set of MQSs. For example, the following are three possible options.

Option 1: If the partitioning rule is content-independent—meaning there is no predetermined correct partition for every work unit—then it is not even necessary to repartition the work units that have already made it into a ready queue or relocation queue. An example of this would be with a round-robin or load balancing partitioning rule, where repartitioning the already-partitioned work units isn't required.

Option 2: For this option, described above, work units in the MQS are withdrawn and returned to the holding queue (optionally using a return sub-queue portion of a holding queue). This option may be the most efficient option when the partitioning rule is content-dependent and the downstream processing is unordered. This would occur, for example, if work units are being partitioned by key, but the processing did not require a particular ordering for work units sharing the same key.

Option 3: This option applies when the partitioning rule is content-dependent and the downstream processing is ordered. This would occur, for example, if the work units are being partitioned by key and work units with the same key, and from the same source, must be processed in order. For this option, repartitioning the work units is sufficient to ensure that work units are processed in the correct partition but not sufficient to guarantee that ordering is maintained. To guarantee a particular partial ordering, a multi-step procedure called an "epoch-transition procedure" can be used. The procedure is used for transitioning between "partitioning epochs" that correspond to periods of time in which the partitioning rule is the same for all partitioners managing an MQS that is part of a particular group of MQSs. Between neighboring partitioning epochs are "transition periods" in which the epoch-transition procedure occurs. In some cases, some partitioning may still be occurring during the transition period with one or more partitioners either starting to use a new partitioning rule, or still using an old partitioning rule. By coordinating the advance from one partitioning epoch to the next, the system 100 can preserve partial ordering across changes in the partitioning rule, as described in more detail below.

The manner in which a partitioner manages an MQS may be different during a partitioning epoch as opposed to a transition period. During a partitioning epoch, the partition for a work unit that enters the recirculate sub-queue doesn't have to be re-computed at the new computing node since the partition computed at the previous computing node is correct, though not necessarily the same as the partition that would have been computed at the new computing node. Whereas during a transition period, the partition for a work unit that enters the recirculate sub-queue is re-computed. For example, for random partitioning, a second partition decision during the same partitioning epoch would be inappropriate for a work unit that has just been relocated to its first randomly selected partition. Instead, any work units entering the recirculate sub-queue can simply be moved directly to the ready queue (one-by-one or in groups of multiple work units).

The MQSs distribute work units among computing nodes 102 over the network 104. A data processing program defines one or more sources (e.g., corresponding to processing components or source components of a data processing graph) that inject work units into the MQSs and one or more worker pools that consume work units from the MQSs (e.g., corresponding to processing components or sink components of a data processing graph). A particular set of MQSs whose partitioners use the same partitioning rule are considered to manage partitioning over a particular sub-network of computing nodes 102. This set of MQSs may be represented as a buffer component within a data processing graph, for example, as described above. Routing through a sub-network used by a set of MQSs is determined by their common partitioning rule and by other constraints of the data processing program, such as ordering constraints. A particular set of MQSs can be categorized as having one of three types, based on their routing constraints.

Type 1: The least constrained routing allows work units to be processed by any worker pool. The data processing program does not require the set of MQSs to route work units to particular worker pools (or particular computing nodes 102), and does not require work units from the same source to be processed in order relative to each other. Therefore, the partitioners managing the MQSs can use partitioning rules such as round-robin or load balancing partitioning.

Type 2: Some data processing programs require work units to be processed by particular worker pools (or particular computing nodes 102) based on a key value derived from the work unit, but do not require that work units from the same source be processed in order at the worker pools. The partitioners managing the MQSs would use key-based partitioning rules.

Type 3: The most constrained routing requires work units to be processed by particular worker pools (or particular computing nodes 102) based on a key value derived from the work unit, and also requires that work units from the same source with the same key be processed at the worker pool in the same order in which they were produced at the source. The partitioners managing the MQSs would use key-based partitioning rules, and would take additional steps to ensure that ordering is preserved.

In some cases it is necessary to change the partitioning rule while the sub-network operates. This could be done to add or remove worker pools, to move a worker pool from one computing node 102 to another, or to change the mapping between work units' keys and the worker pools that process them. When the partitioning rule changes, work units stored at an MQS associated with a particular partition may be in the wrong partition according to the new partitioning rule. Those work units need to be moved to their new correct partitions, and certain steps are taken to preserve order.

Within a partitioning epoch any work unit can be routed to its destination by examining its key no more than once. The partitioner only needs to examine a work unit's key when it moves the work unit from the pending sub-queue (of the holding queue) to either the ready queue or the relocation queue of its MQS. Work units arriving into the recirculate sub-queue (of the holding queue) can be moved directly to the ready queue without re-examining their key because it is known that the work unit was routed to this MQS based on the same partitioning rule that has been in effect during the entirety of the current partitioning epoch.

If one work unit follows a path through a sub-network from source A to worker pool P, then all work units that originate at source A and are consumed by worker pool P during the same partitioning epoch will follow the same path from A to P. Because all work units sent from A to P follow the same path and partitioners are configured to preserve relative ordering of work units in transit, the order in which work units were produced at the source will be preserved in the order in which they are consumed by the worker pool, for every pair of source and worker pool. Two work units that originate at different sources or that are consumed by different worker pools necessarily take different paths through a sub-network, and therefore there is no defined ordering between those work units.

When the partitioning rule is changed for at least one of the partitioners managing an MQS in the set, the current partitioning epoch ends and a transition period to a new partitioning epoch begins. During the transition period, the invariants that guarantee order is preserved are allowed to be violated. Depending on the ordering and partitioning requirements of the data processing program, different approaches are required to safely transition to the new partitioning epoch.

A simple and low-cost transition strategy is to simply update the partitioners to use the new partitioning rule without spending any time to reprocess any work units already in the recirculate sub-queue, relocation queue, or ready queue. This strategy is acceptable only for MQS sets of Type 1. Some work units whose key was examined during partitioning epoch N will be consumed during partitioning epoch N+1 by a different worker pool than they would be routed to if examined during epoch N+1, but this is acceptable for MQS sets of Type 1 because routing of work units to particular pools is not a requirement for MQS sets of that type.

A higher-cost transition strategy involves reprocessing work units during the transition period. MQS sets of Type 2 and Type 3 do require that work units be consumed by a particular worker pool determined from the work units' keys according to the current partitioning rule. When the partitioning rule changes (during a transition period), the correct destination worker pool for work units may also change. Therefore, the partitioners reprocess the work units, which includes re-examining the work unit keys and potentially re-routing the work units to their correct destination if necessary, according to the new partitioning rule. There are two ways to handle the reprocessing during the transition period, depending on whether ordering must be preserved (Type 3) or not (Type 2).

For Type 2 MQS sets, the re-examination and potential re-routing of work units is required, but preserving the ordering is not. In this case, work units can be reprocessed by withdrawing the work units in all ready queues, recirculate sub-queues, and relocation queues of all MQSs in the set, and inserting them into the appropriate pending sub-queue. After this reprocessing, in the next partitioning epoch, work units will be partitioned using the new partitioning rule and consumed at the correct destination worker pools.

The following is an example of a Type 2 epoch-transition procedure (from routing epoch N to N+1) for Type 2 MQS sets, performed by each partitioner on its respective MQS:

Suspend processing work units from any queue (or sub-queue).

Withdraw work units from the recirculate sub-queue, relocation queue, and ready queue into pending sub-queue.

Switch to partitioning according to the partitioning rule for partitioning epoch N+1.

Resume processing work units from all queues (and sub-queues).

Ordering is not guaranteed to be preserved in this epoch-transition procedure, since work units that were sent during partitioning epoch N but not delivered until partitioning epoch N+1 may follow two different paths through the sub-network, depending on whether they had already been relocated (from a relocation queue to a recirculate sub-queue) before the partitioning epoch transition. If work units converge on a destination worker pool along both paths at the same time, they may be interleaved, in which case relative ordering will be lost. That is why this procedure is acceptable for Type 2 MQS sets but not for Type 3 MQS sets.

For an MQS set of two MQSs—MQS 1 and MQS 2—consider the state of work units all having the same particular key K and during partitioning epoch N are assigned to partition 2 such that they follow the same path from a source S feeding MQS 1, then being relocated to MQS 2, and then being consumed by the worker pool at MQS 2. In this example, the contents of the queues at the end of partitioning epoch N are as follows, with work units labeled by record number R# according to the order in which they were provided from the source S, work units being removed from the head at the left and added to the tail at the right, and a blank list indicating an empty queue or sub-queue:

MQS 1
   pending sub-queue: R7, R8
   recirculate sub-queue:
   relocation queue: R6
   ready queue:
MQS 2
   pending sub-queue:
   recirculate sub-queue: R4, R5
   relocation queue:
   ready queue: R3

Then after the epoch-transition procedure, all work units in each MQS have been withdrawn and moved to the pending sub-queue, which would yield:

MQS 1
  pending sub-queue: R6, R7, R8
  recirculate sub-queue:
  relocation queue:
  ready queue:
MQS 2
  pending sub-queue: R3, R4, R5
  recirculate sub-queue:
  relocation queue to:
  ready queue:

Based on the new partitioning rule for partitioning epoch N+1, work units with the key K are assigned to partition 1 to be consumed by the worker pool at MQS 1 instead of the worker pool at MQS 2, so during partitioning epoch N+1 work units are moved to the relocation queue of MQS 2, then sent to the recirculate sub-queue of MQS 1, and eventually moved to the ready queue of MQS 1 for consumption by its worker pool. Those work units will all end up in the MQS 1 ready queue, but the relative ordering of the work units is not guaranteed. The following is a valid state after the partitioners for MQS 1 and MQS 2 process some work units:

MQS 1
  pending sub-queue: R8
  recirculate sub-queue: R4
  relocation queue:
  ready queue: R6, R3, R7 (work units are out of order)
MQS 2
  pending sub-queue:
  recirculate sub-queue:
  relocation queue: R5
  ready queue:

Type 3 MQS sets require that ordering be preserved across partitioning epoch transitions. To guarantee this, all work units that were processed during epoch N but not consumed must be delivered to the recirculate or ready queue at their new final destination, in order, before any work units can be processed during epoch N+1.

The following is an example of a Type 3 epoch-transition procedure (from routing epoch N to N+1) for Type 3 MQS sets, performed by each partitioner on its respective MQS, which achieves the required ordering guarantee:

Suspend consuming work units from ready queues (they can still receive new work units).
  Split the pending sub-queues into two queues. The Epoch N+1 pending sub-queue contains all of the work units that were in the pending sub-queue and newly arriving work units can be added to it, but no work units will be removed from it. The Epoch N pending sub-queue starts empty, but once withdrawn work units are placed into it they can be re-examined and potentially re-routed.
  Continue processing according to the partitioning rule for partitioning epoch N until all relocation queues are fully drained.
  At this point all work units with the same key will be together in either the recirculate sub-queue or ready queue of the same MQS. They may be intermixed with other work units with different keys or other work units with the same key from different sources, but the relative ordering of work units with the same key from the same source will be preserved.
  Switch to partitioning according to the partitioning rule for partitioning epoch N+1.
  Withdraw work units from the recirculate sub-queue and ready queue into the Epoch N pending sub-queue, preserving their original ordering (for work units that originated at the same source).
  Resume consuming work units from the ready queues.
  Wait until all of the Epoch N pending sub-queues are fully drained and the relocation queues are empty.

At this point all work units will be at their correct destination for the new partitioning function and order will have been preserved by the partitioners. The partitioners can follow certain rules during the withdrawal process to preserve ordering. For example, if each partitioner withdraws the work units back into the Epoch N pending sub-queue with the work units from the ready queue at the head, work units from the recirculate sub-queue next, and the original work units in the pending sub-queue at the tail (with the work units not reordered as they are withdrawn), then the ordering constraint will be preserved, such that work units from the same source and in the same key group will still be in order after the withdrawal process completes. The only work units that might have been reordered relative to each other are ones that came from different pending sub-queues or recirculate sub-queues, and that can only happen if they came from different sources originally or were sent to different MQSs because they have different keys. Either way, that reordering is allowed because work units must have both the same source and the same key to have a defined ordering constraint.

Discard the empty Epoch N pending sub-queue and resume reading from the Epoch N+1 pending sub-queue, which is now just the normal pending sub-queue since the partitioners have fully transitioned to partitioning epoch N+1.

The following is how the Type 3 epoch-transition procedure would handle the same starting work unit configuration used above in the example of the Type 2 epoch-transition procedure, where the contents of the queues at the end of partitioning epoch N are as follows:

MQS 1
  pending sub-queue: R7, R8
  recirculate sub-queue:
  relocation queue: R6
  ready queue:
MQS 2
  pending sub-queue:
  recirculate sub-queue: R4, R5
  relocation queue:
  ready queue: R3

After splitting the pending sub-queues, the contents are as follows:

MQS 1
  pending sub-queue N:
  pending sub-queue N+1: R7, R8
  recirculate sub-queue:
  relocation queue: R6
  ready queue:
MQS 2
  pending sub-queue N:
  pending sub-queue N+1:
  recirculate sub-queue: R4, R5
  relocation queue:
  ready queue: R3

Then the partitioners continue processing with the partitioning rule for partitioning epoch N until the relocation queues are drained (with work unit R4 being allowed to move from the head of the recirculate sub-queue to the tail of the ready queue):

MQS 1
  pending sub-queue N:
  pending sub-queue N+1: R7, R8
  recirculate sub-queue:
  relocation queue:
  ready queue:
MQS 2
  pending sub-queue N:
  pending sub-queue N+1:
  recirculate sub-queue: R5, R6
  relocation queue:
  ready queue: R3, R4

After the relocation queues are empty, the recirculate sub-queue and ready queues can be withdrawn into the Epoch N pending sub-queues:

MQS 1
  pending sub-queue N:
  pending sub-queue N+1: R7, R8
  recirculate sub-queue:
  relocation queue:
  ready queue:
MQS 2
  pending sub-queue N: R3, R4, R5, R6
  pending sub-queue N+1:
  recirculate sub-queue:
  relocation queue:
  ready queue:

Then the partitioners resume processing normally using the partitioning rule for partitioning epoch N+1 partitioning rule, removing work units from the Epoch N pending sub-queues until they are fully drained and the relocation queues are empty, which eventually leads to the following state (with work units R3-R5 being allowed to move from the recirculate sub-queue to the ready queue):

MQS 1
  pending sub-queue N:
  pending sub-queue N+1: R7, R8
  recirculate sub-queue: R6
  relocation queue:
  ready queue: R3, R4, R5
MQS 2
  pending sub-queue N:
  pending sub-queue N+1:
  recirculate sub-queue:
  relocation queue:
  ready queue:

After all of the work units have been relocated to the correct destination MQS and the Epoch N pending sub-queues and the relocation queues are empty, then the partitioners can discard the empty Epoch N pending sub-queues and continue processing normally using the Epoch N+1 pending sub-queues as the only pending sub-queues:

MQS 1
  pending sub-queue: R7, R8
  recirculate sub-queue: R6
  relocation queue:
  ready queue: R3, R4, R5
MQS 2
  pending sub-queue:
  recirculate sub-queue:
  relocation queue:
  ready queue:

At this point the partitioners have successfully transitioned to the new partitioning epoch and have the work units at the correct destination and in the correct order.

The dynamic partitioning approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, data processing graph-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for processing data in a computing system, using queues that store work units including holding queues, relocation queues, and ready queues, the method including:

receiving work units into a plurality of holding queues stored in storage of one or more nodes of the computing system; and processing the work units from the plurality of holding queues using at least one processor in each of the one or more nodes, the processing including:

determining, for each of the holding queues, one of a plurality of partitions assigned to each work unit stored in that holding queue according to a partitioning rule, where each partition is associated with a unique holding queue, separating work units from each holding queue into a corresponding one of at least two other queues stored in the same storage as that holding queue, the two other queues including a relocation queue for each work unit whose assigned partition is not associated with the holding queue in which it is stored, and a ready queue for each work unit whose assigned partition is associated with the holding queue in which it is stored, relocating each work unit in each relocation queue to the holding queue associated with the partition assigned to that work unit, and repartitioning the work units in response to a change in the partitioning rule to a new partitioning rule before the plurality of holding queues are empty.

2. The method of claim 1, wherein the change in the partitioning rule includes a change in the total number of partitions in the plurality of partitions.

3. The method of claim 1, wherein the one or more nodes of the computing system include a plurality of nodes, at least a first node of the plurality of nodes has storage that stores a first holding queue associated with a first partition and stores a first relocation queue and a first ready queue corresponding to the first holding queue, and at least a second node of the plurality of nodes has storage that stores a second holding queue associated with a second partition and stores a second relocation queue and a second ready queue corresponding to the second holding queue.

4. The method of claim 3, wherein the change in the partitioning rule includes a change in the total number of nodes in the plurality of nodes that have storage used for storing any of the holding queues.

5. The method of claim 3, wherein relocating one or more work units in the first relocation queue includes transmitting a message including the one or more work units from the first node to the second node, where the second partition is assigned to each of the one or more work units included in the message.

6. The method of claim 3, wherein the storage of the first node also stores a third holding queue associated with a third partition and stores a third relocation queue and a third ready queue corresponding to the third holding queue.

7. The method of claim 1, wherein the repartitioning includes returning any work units stored in a relocation queue and a ready queue corresponding to a particular holding queue to that particular holding queue.

8. The method of claim 7, wherein the partitioning rule uses a content-dependent assignment of one of the plurality of partitions to each work unit, where the partition assigned to a particular work unit is determined based on at least one value included in the work unit.

9. The method of claim 7, wherein each holding queue includes a first portion for storing work units for which an initial partition determination has not yet been made, and a second portion for storing work units for which an initial partition determination had been made causing those work units to be relocated to that holding queue.

10. The method of claim 9, wherein separating work units from each holding queue into a corresponding relocation queue or ready queue includes separating work units stored in the first portion only when the second portion is empty.

11. The method of claim 9, wherein at least a first holding queue includes a third portion for storing any work units that were returned to that holding queue after the change in the partitioning rule.

12. The method of claim 11, wherein the repartitioning further includes: determining, for the first holding queue, one of a plurality of partitions assigned to each work unit stored in the first holding queue according to a new partitioning rule, and separating work units from the first holding queue into a corresponding relocation queue or ready queue.

13. The method of claim 12, wherein separating work units from the first holding queue into a corresponding relocation queue or ready queue includes: separating work units stored in the second portion only when the third portion is empty, and separating work units stored in the first portion only when both the second portion and third portion are empty.

14. The method of claim 1, wherein the partitioning rule uses a content-independent assignment of one of the plurality of partitions to each work unit, where the partition assigned to a particular work unit is determined independently of any values included in the work unit.

15. The method of claim 14, wherein the partitioning rule uses a load balancing assignment of one of the plurality of partitions to each work unit, where the partition assigned to a particular work unit is determined based on a quantitative measure of load for different partitions.

16. The method of claim 15, wherein the quantitative measure of load for different partitions is a quantitative measure of backlog of different sets of stored work units to be relocated to holding queues associated with different partitions.

17. The method of claim 1, further including processing work units from a first ready queue using one or more workers executing on a first node.

18. The method of claim, 17, wherein the repartitioning includes determining whether the new partitioning rule uses: (1) a content-dependent assignment of one of the plurality of partitions to each work unit, where the partition assigned to a particular work unit is determined based on at least one value included in the work unit, or (2) content-independent assignment of one of the plurality of partitions to each work unit, where the partition assigned to a particular work unit is determined independently of any values included in the work unit.

19. The method of claim 18, wherein the repartitioning includes determining whether processing work units from the first ready queue includes processing work units originating from a first holding queue in the same order in which the work units were received into the first holding queue.

20. The method of claim 19, wherein the repartitioning includes draining all relocation queues before changing the partitioning rule from an old partitioning rule to the new partitioning rule, and after determining that the new partitioning rule uses content-dependent assignment and that processing work units form the first ready queue includes processing work units originating from a first holding queue in the same order in which the work units were received into the first holding queue.

21. The method of claim 20, wherein the draining includes: (1) relocating each work unit in each relocation queue to a holding queue associated with the partition assigned to that work unit according to the old partitioning rule, and (2) suspending processing of work units from the first ready queue during the draining.

22. The method of claim 1, wherein the partitioning rule uses a key-based assignment of one of the plurality of partitions to each work unit, where the partition assigned to a particular work unit is determined based on a function of a key value included in the work unit.

23. The method of claim 22, wherein the one or more nodes of the computing system include a plurality of nodes, and storage of the plurality of nodes includes: the plurality of holding queues, and shared data accessible to each of the plurality of nodes based on key values.

24. The method of claim 23, wherein the shared data is accessed by at least a first processor in a first node of the plurality of nodes during processing of one or more work units from a first ready queue stored in storage of the first node.

25. The method of claim 23, wherein the shared data is partitioned according to the plurality of partitions assigned to the work units, where each key value used for accessing the shared data is associated with a unique partition of the plurality of partitions.

26. The method of claim 25, wherein repartitioning the work units in response to a change in the partitioning rule occurs after beginning to repartition the shared data according to a new partitioning rule.

27. The method of claim 26, wherein repartitioning the shared data according to the new partitioning rule includes: determining, for each reference unit of a plurality of reference units stored in the shared data, one of a plurality of partitions assigned to that reference unit according to the new partitioning rule, transferring from a previous node to a new node any reference unit whose assigned partition is not associated with the node on which that reference unit is stored, and attempting to access at least one of the reference units transferred to a new node during the repartitioning of the shared data at both the previous node and the new node.

28. The method of claim 1, wherein the processing further includes: providing at least one result from each ready queue, the result from each ready queue being based on one or more work units stored in that ready queue, and removing from each ready queue work units for which a result has been provided.

29. A non-transitory computer-readable medium comprising software instructions stored thereon, the software instructions, when executed by a computing system, cause said system to process data using queues that store work units including holding queues, relocation queues, and ready queues, the processing including causing the computing system to:
receive work units into a plurality of holding queues stored in storage of one or more nodes of the computing system; and
process the work units from the plurality of holding queues using at least one processor in each of the one or more nodes, the processing including:
determining, for each of the holding queues, one of a plurality of partitions assigned to each work unit stored in that holding queue according to a partitioning rule, where each partition is associated with a unique holding queue,
separating work units from each holding queue into a corresponding one of at least two other queues stored in the same storage as that holding queue, the two other queues including a relocation queue for each work unit whose assigned partition is not associated with the holding queue in which it is stored, and a ready queue for each work unit whose assigned partition is associated with the holding queue in which it is stored,
relocating each work unit in each relocation queue to the holding queue associated with the partition assigned to that work unit, and
repartitioning the work units in response to a change in the partitioning rule to a new partitioning rule before the plurality of holding queues are empty.

30. A computing system for processing data, using queues that store work units including holding queues, relocation queues, and ready queues, the computing system including:
one or more nodes, each including:
an input device or port configured to receiving work units into at least one holding queue stored in storage, of a plurality of holding queues; and
at least one processor configured to process the work units from the holding queue;
wherein processing for the plurality of holding queues includes: determining, for each of the holding queues, one of a plurality of partitions assigned to each work unit stored in that holding queue according to a partitioning rule, where each partition is associated with a unique holding queue, separating work units from each holding queue into a corresponding one of at least two other queues stored in the same storage as that holding queue, the two other queues including a relocation queue for each work unit whose assigned partition is not associated with the holding queue in which it is stored, and a ready queue for each work unit whose assigned partition is associated with the holding queue in which it is stored, relocating each work unit in each relocation queue to the holding queue associated with the partition assigned to that work unit, and repartitioning the work units in response to a change in the partitioning rule to a new partitioning rule before the plurality of holding queues are empty.

* * * * *